Patented June 6, 1933

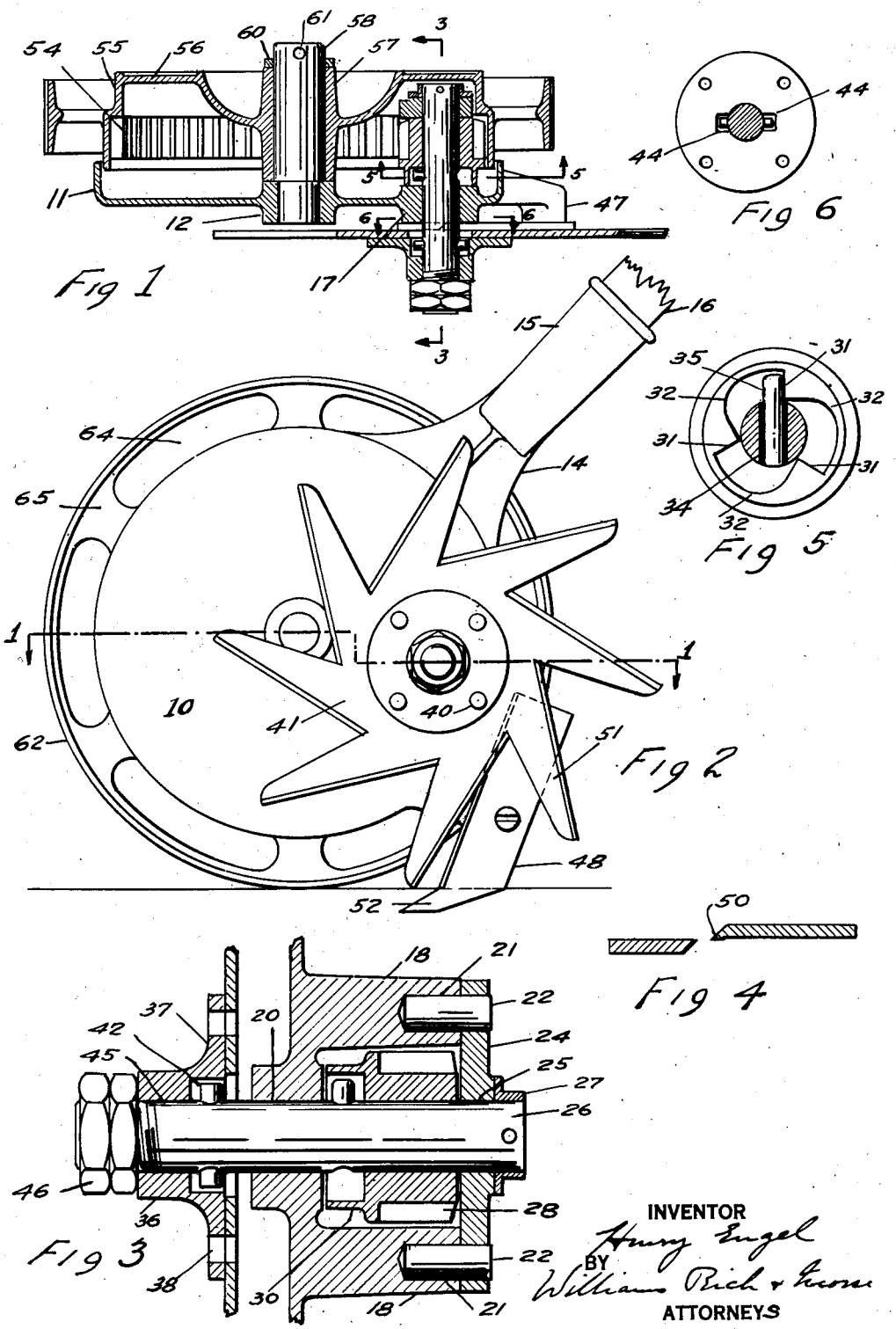

1,912,893

UNITED STATES PATENT OFFICE

HENRY ENGEL, OF QUEENS VILLAGE, NEW YORK

LAWN AND TURF EDGER

Application filed May 15, 1931. Serial No. 537,621.

This invention relates to lawn and turf edgers such as are adapted for trimming a lawn or turf adjacent sidewalks, flower beds and the like, where the turf and grass has a tendency to spread out and grow as an irregular border.

An object of the invention is to provide a simple and efficient device of the character mentioned which is cheap to manufacture, reliable in operation, easy to manipulate, and capable of being handled with ease when employed as a labor-saving device in the capacity for which it is intended.

Other objects and advantages of the invention will become apparent from the following description, taken in connection with the accompanying drawing in which—

Fig. 1 is a horizontal sectional view taken on line 1—1 of Fig. 2;

Fig. 2 is a side elevation of the device;

Fig. 3 is an enlarged sectional view taken on line 3—3 of Fig. 1 and showing details of the rotary cutter assembly and the driving means therefor;

Fig. 4 is a transverse sectional view through the stationary cutter and one of the rotating blades and showing the bevelled relation of the cutting edges of such elements;

Fig. 5 is a vertical sectional view taken on line 5—5 of Fig. 1 and showing details of a pawl and ratchet mechanism for establishing a driving connection between the driving pinion and the rotary cutter shaft on which that pinion is mounted; and Fig. 6 is a sectional view taken on line 6—6 of Fig. 1 and showing in detail means for locking the rotary cutter against rotation with respect to its driving shaft.

Referring to the drawing, the numeral 10 indicates a metal plate, preferably cast, which is provided with a peripheral flange 11, disposed in a plane concentric to the axis of the plate. The plate 10 is provided centrally with a hub portion 12 and is formed with an upwardly and rearwardly projecting arm 14, provided with a ferrule-like socket 15, adapted to receive a handle 16 of suitable length, whereby the device may be pushed along over the turf by an operator much in the order in which a lawn mower of conventional design is manipulated. The plate 10 is also formed with a bearing 17 which, as viewed in Fig. 2, is located rearwardly of the hub portion 12 and somewhat below the horizontal plane of the same. Carried by the inner wall of the plate 10, are a pair of inwardly projecting bosses 18, which are spaced from each other and are located in the vertical plane of a shaft receiving opening 20 formed in the bearing 17. These bosses are drilled at their outer ends to provide sockets 21, adapted for the reception of anchor pins 22, which are frictionally held within the respective sockets. These pins are of such length that they project beyond the outer ends of the bosses 18 and are adapted to receive a bearing plate 24, having a central bearing or opening 25.

Journalled within the openings 20 and 25 of the bearing 17 and bearing plate 24, respectively, is a cutter driving shaft 26, to one end of which is pinned or otherwise suitably connected a thrust bearing 27, adapted to engage the outer face of the bearing plate 24, as shown most clearly in Fig. 3. Rotatably mounted on the shaft 26, at a point intermediate the bearing 17 and the bearing plate 24, is a driving pinion 28, one end of which is provided with a flange 30, the inner wall of which is formed with a plurality of abutments 31 and a plurality of cam surfaces 32. Loosely mounted in a transverse opening 34 formed in the shaft 26, is a pawl 35 which is adapted to engage one or another of the abutments 31 when the pinion 28 is rotated in a given direction, through operating means hereinafter more particularly described, whereby the shaft 26 is operatively connected to the pinion. As to the cams 32, they are of such a character as to permit the pawl 35 to reciprocate within the opening 34, when the pinion 28 is rotated in a reverse direction, without establishing an operative connection between the shaft 26 and the driving pinion.

Carried by the shaft 26, at the outer end thereof, is a hub-like element 36, having a flange 37, disposed perpendicularly to the shaft 26 and provided with a plurality of openings 38, adapted for the reception of rivets or the like 40 by which a rotary cutter 41 may be connected to the inner face of the flange. The hub-like element 36, together with the cutter 41, is locked against rotation with respect to the shaft 26 by a locking pin 42 located within diametrically opposed sockets 44, formed in the hub-like element substantially perpendicularly to the central opening 45 thereof. The sockets 44 are sufficiently deep to permit the hub-like element, together with the cutter 41, to be moved longitudinally of the shaft 26 when it is desired to effect an adjustment of the cutter, in a manner hereinafter more particularly described. The outer end of the shaft 26 is screw-threaded, as shown, and is provided with one or more nuts 46, by which the cutter 41, shaft 26, bearing plate 24, pinion 28 and their respectively associated parts may be held in a properly assembled relation.

Carried by the plate 10, is a downwardly and rearwardly projecting bracket or arm 47, to the face of which is suitably connected a stationary cutter 48, the cutting edge of which is disposed in a definite plane which is inclined rearwardly, as viewed in Fig. 2. The forward margin of the stationary cutter 48 is turned outwardly, as shown most clearly in Fig. 4, so as to provide a rib 50, the outer surface of which is coincident to or lies within a plane slightly remote to the surface of the body portion of the cutter, so that the cooperating cutter blades 51 of the rotary cutter 40 will engage only the outer face of the rib 50 as they move past the stationary cutter.

Referring to Fig. 4, it will be noted that the cutting edges of the cutter blades 51 are oppositely bevelled to the cutting edge of the stationary cutter 48, and referring to Fig. 2, it will be noted that the cutting edges of the cutter blades 51 are disposed tangentially to a given circle described about the axis of rotation of the cutter 41 and that the cutting edge of the stationary cutter is disposed in a cordial relation to that circle. Thus, it will be appreciated that the cutting edges of the cutting blades 51 bear a peculiar relation to the cutting edge of the stationary cutter 48 and that as a result of such relation a shearing action, as will be readily understood from Fig. 2, is effected between the cutting edge of the stationary cutter and the cutting edge of each cutter blade as such cutter blades move past the cutting element in a counter-clockwise direction. Moreover, it will be noted that the central area of the cutter 41, namely, that portion of the cutter which is located inwardly of the cutter blades 51, is maintained at all times in engagement with the upper end of the rib 50 to prevent the cutter from being unduly moved inwardly on the shaft 26.

Carried by the cutter element 48, is a forwardly projecting and rearwardly inclined turf-lifting foot 52, the upper inclined edge or surface of which joins the body portion of the stationary cutter at a point in the vicinity of or immediately below the lower end of the cutting edge of the stationary cutter. This turf-lifting foot 52 is adapted to operate somewhat below the surface of the ground over which the device is operated, so as to engage the turf from beneath and lift the same into a proper position with respect to the cutting edge of the stationary cutter to be there severed by the rotating cutter blades as they move past the cutting edge of the stationary cutter.

The means herein shown for rotating the pinion 28 comprises an internal gear 54 carried by the peripheral flange 55 of a plate 56, provided centrally with an elongated bearing or hub 57, which is journalled on a stub shaft 58, having its reduced end frictionally or otherwise suitably held within the hub portion 12 of the plate 10. The gear 54, together with its associated elements, namely, the plate 56 and the hub 57, are held on the stub shaft 58 by any suitable means such, for example, as by a washer 60 and pin 61, both of which are carried by the outer end of the stub shaft, and the latter of which is so located with respect to the washer as to hold the same against undue displacement.

Referring particularly to Fig. 1, it will be noted that the plates 10 and 56, together with their associated peripheral flanges 11 and 55, which flanges are slightly telescoped with respect to each other, constitute a protective housing for such elements of the device as should be reasonably protected from dirt, grit, and other foreign matter. Secured to the peripheral flange 55 of the plate 56 is a suitable traction wheel 62. This traction wheel is preferably cast integral with the flange 55 and its associated plate 56 and hub 57, the casting operation being carried out so as to provide a plurality of arcuately spaced openings 64 intermediate the similarly spaced webs 65, by which the wheel is united to said flange.

In operation, the device is pushed along by an operator, much in the manner of the conventional type of lawn mower, whereby the traction wheel 62 is rotated in a counter-clockwise direction, as viewed in Fig. 2, causing the pinion 28, which under such conditions is locked to the shaft 26, to rotate the cutter 41 also in a counter-clockwise direction. As the turf is lifted by the foot 52, such turf, together with the grass to be trimmed or edged, is subjected to a shearing action between the stationary cutter 48 and the respective cutter blades 51 as they move into shearing position.

If it should be desired to so adjust the rotary cutter 41 as to effect a more intimate engagement of the cutting blades 51 thereof with the stationary cutter 48, such adjustment may be readily made by screwing one of the nuts 46 farther down on the shaft 26, as will be readily understood, the other of such nuts being then run down into engagement with the first to effectively lock the same on such shaft and hold the cutter in its proper position of adjustment.

Although only one form of the invention is herein shown and described, it will be understood that various changes may be made without departing from the spirit of the invention or the scope of the following claims.

What is claimed is:

1. A device of the character described comprising a rolling support including a stationary plate and a traction wheel journalled to said plate, a driving gear carried by said traction wheel, a pair of lugs carried by said stationary plate at one side thereof, a bearing plate connected to said lugs, a shaft journalled in said stationary plate and said bearing plate, said shaft having an end projecting from the other side of said bearing plate, a pinion carried by said shaft intermediate said plates and said lugs and meshing with said gear, a rotary cutter slidably mounted on said projecting end of said shaft and locked against rotation with respect to said shaft, a stationary cutter supported intermediate said stationary plate and said rotary cutter, means for moving said rotary cutter longitudinally of said shaft and towards said stationary cutter while said rotary cutter is locked against rotation with respect to said shaft, and a thrust bearing carried by said shaft and engaging said bearing plate, said thrust bearing cooperating with said bearing plate to retain said shaft against longitudinal displacement in one direction and said rotary cutter cooperating with said stationary cutter to retain said shaft against longitudinal displacement in the opposite direction.

2. A device of the character described comprising a rolling support, a shaft journalled in said support and having one of its ends projecting beyond said support, thrust means associated with said shaft for retaining it against longitudinal displacement in one direction, a bladed rotary cutter slidably mounted on said projecting end of said shaft and locked against rotation with respect to said shaft, a stationary cutter supported intermediate said thrust means and said rotary cutter and having face-to-face engagement with said rotary cutter, means for retaining said rotary cutter against removal from said projecting end of said shaft and for moving said rotary cutter longitudinally on said shaft and toward said stationary cutter to increase the intimacy of contact between said cutters while said rotary cutter is locked against rotation with respect to said shaft, said rotary cutter and stationary cutter cooperating with each other to retain said shaft against longitudinal displacement in a direction opposite to said one direction, and means for rotating said shaft whereby the blades of said rotary cutter are moved successively past said stationary cutter.

In testimony whereof, I have signed this specification.

HENRY ENGEL.